United States Patent
Koepnick

[15] 3,662,871
[45] May 16, 1972

[54] ARTICLE ALIGNER FOR A CONVEYOR SYSTEM

[72] Inventor: Paul J. Koepnick, Grand Rapids, Mich.
[73] Assignee: Werner Lehara, Inc., Grand Rapids, Mich.
[22] Filed: Sept. 16, 1970
[21] Appl. No.: 72,586

[52] U.S. Cl. ............................................................198/30
[51] Int. Cl. .....................................................B65g 47/26
[58] Field of Search .................198/29, 30, 34, 223; 214/89

[56] References Cited
UNITED STATES PATENTS
3,498,441  3/1970  Furedy et al. ........................198/29

*Primary Examiner*—Evon C. Blunk
*Assistant Examiner*—Alfred N. Goodman
*Attorney*—Price, Heneveld, Huizenga & Cooper

[57] ABSTRACT

For aligning articles on a conveyor in straight rows extending transversely of the conveyor. A device is provided which includes an aligner element with means for moving the aligner element into an upper and lower position out of or into engagement with articles. Actuator means is provided for moving the aligner also in a direction longitudinally with the conveyor for contacting the articles from behind and aligning them in straight lines transversely and longitudinally of the conveyor.

13 Claims, 4 Drawing Figures

INVENTOR.
PAUL J. KOEPNICK

ARTICLE ALIGNER FOR A CONVEYOR SYSTEM

BACKGROUND OF THE INVENTION

Many different devices have been devised for aligning articles in straight rows running transversely and longitudinally of a conveyor. However, such apparatus has not been completely satisfactory, particularly for fragile and disintegratable articles such as cakes. In aligning such articles the aligner must not exert a breaking force to the article by brushing over the top or exerting a great force opposing the motion of the articles. Further, the apparatus must be relatively uncomplicated, inexpensive, and rugged in construction. Therefore, to my knowledge, no one has devised a completely satisfactory aligner for such articles which is reasonably simple and inexpensive in cost of manufacture and/or which is sufficiently rugged to withstand the wear and tear encountered by such apparatus.

SUMMARY OF THE INVENTION

The present invention is related to apparatus for aligning such articles particularly cakes in straight lines and longitudinally transversely of the conveyor. This is accomplished without exerting a breaking force to the cakes so as to damage the same.

The present invention of an aligner for articles on a conveyor provides for aligning the articles from behind so that the aligner is moving along with the conveyor and, therefore, there is no opposition to the force exerted on the articles by the conveyor.

This invention also provides the unique construction for accomplishing the above action in a way which is simple and inexpensive, requiring very few parts and being rugged and dependable.

Further, this invention has as an object the aligning of articles by a sequential operation of first lowering the aligner element and then actuating the element in the direction of flow of the articles so as not to damage them.

Additional objects will become evident from a reading of the following description made in conjunction with the accompanying drawings which include as follows:

DESCRIPTION OF THE PREFERRED EMBODIMENT

Figure 1:
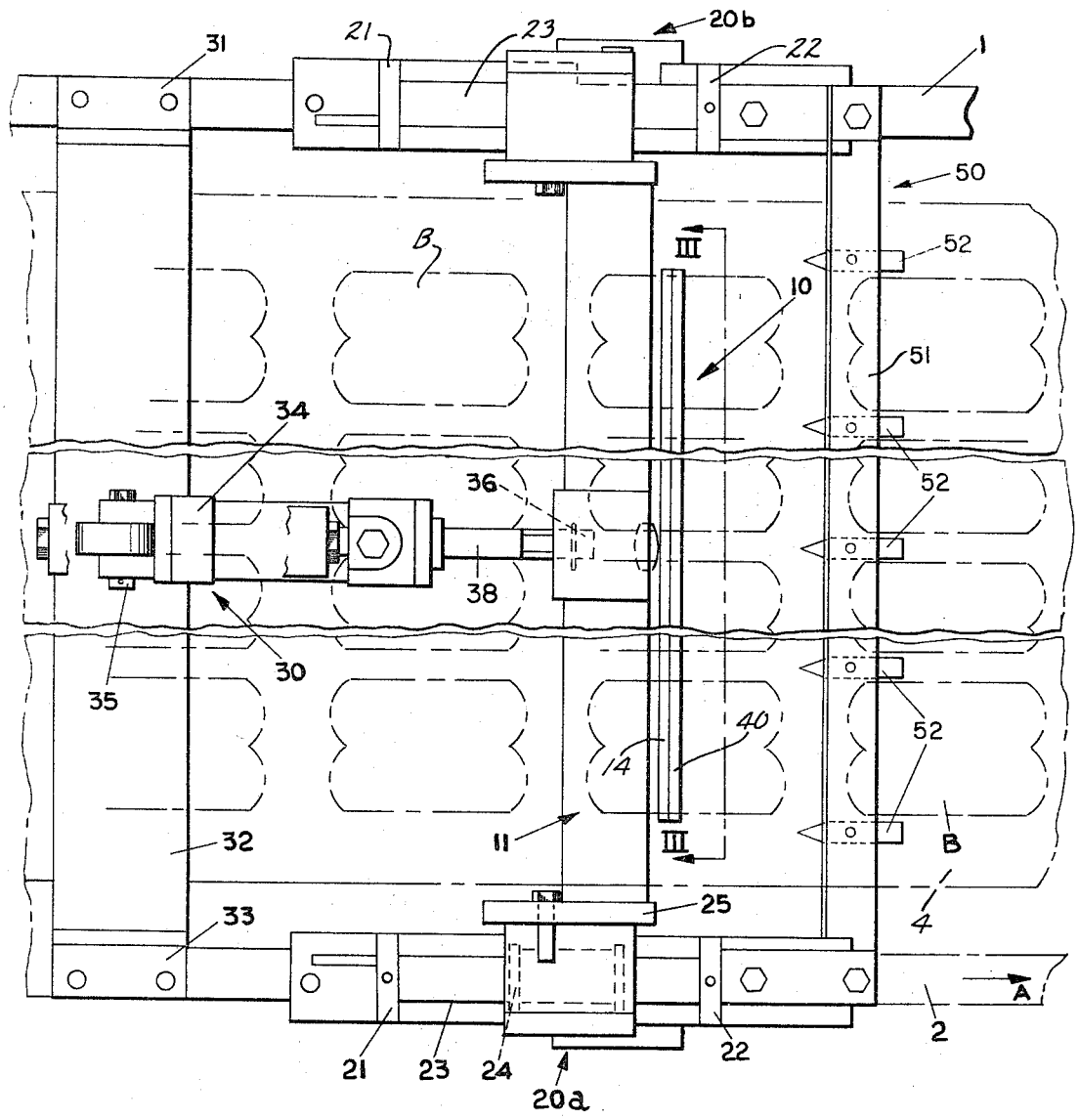
FIG. 1 is a plan view of the aligner apparatus shown in conjunction with a conveyor and articles on the conveyor.

Referring specifically to the drawings, reference numerals 1 and 2 designate the side frames for the conveyor which includes the bed 3 and the conveyor belt 4. As disclosed by the arrows A in FIGS. 1 and 2, the conveyor belt is travelling toward the right thus carrying the articles B thereon at a predetermined rate determined by the speed of the conveyor. It should be understood that the articles B are only approximately in alignment in a direction transverse or across the conveyor belt 4 but the alignment is not satisfactory and thus the aligner apparatus is provided for the purpose of aligning them exactly on a straight line running transversely of the conveyor belt 4.

The cake aligner apparatus which is mounted on the conveyor frame members 1 and 2 comprises several subassemblies including the vertical actuator mechanism 10, the guide or track mechanisms 20a and 20b cone located on each side of the conveyor) the longitudinal actuator mechanism 30, and the longitudinal aligner assembly 50 as will be described hereinafter. The vertical actuator mechanism 10 controls the vertical position of the aligner element 40 for either contacting or not contacting the articles. The guide or track mechanisms 20a and 20b guide the vertical actuating mechanism for movement longitudinally of the conveyor. The longitudinal actuator mechanism 30 actuates or moves the vertical actuator mechanism 10 longitudinally of the conveyor, and the longitudinal aligner assembly 50 in conjunction with mechanisms 10 and 30 align the articles in rows running lengthwise of the conveyor.

Figure 2:
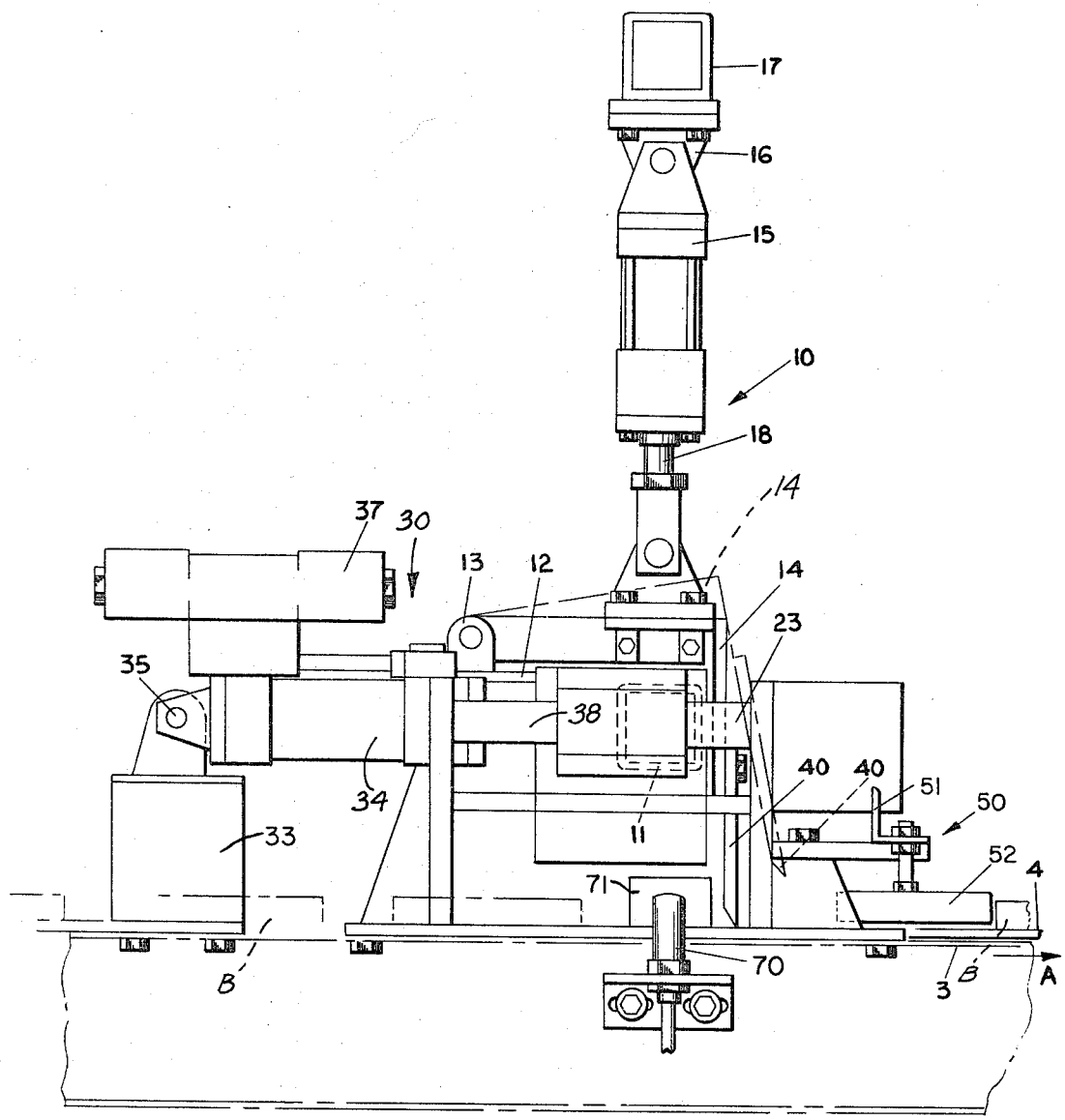
FIG. 2 is a side elevational view of the aligner apparatus as also illustrated by FIG. 1.
Figure 3:
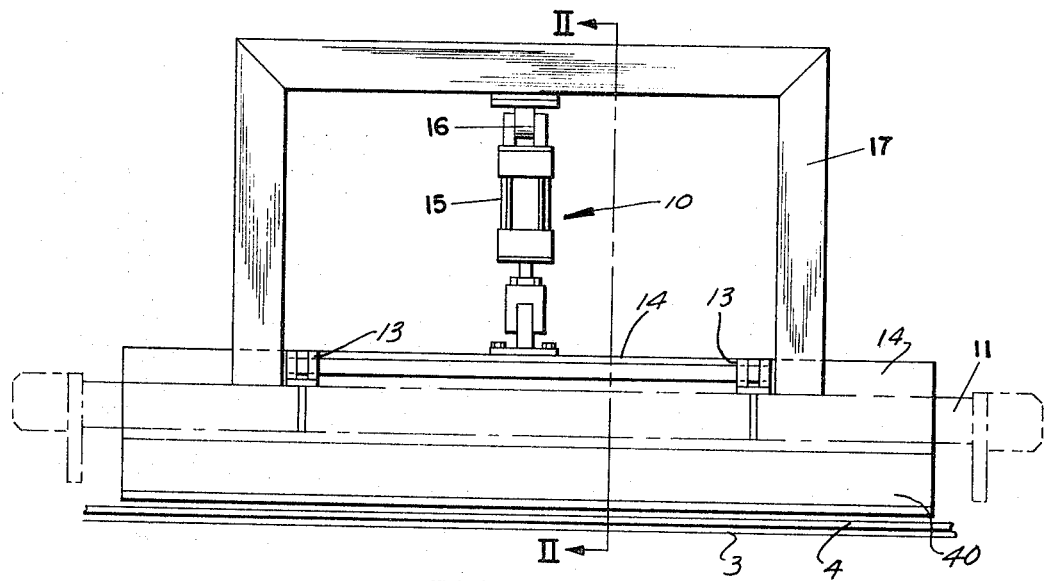
FIG. 3 is a front elevational view of the aligner apparatus looking in the direction of the arrows indicated by the cross-sectional lines III—III of FIG. 1.

Referring specifically to these mechanisms of subassemblies, reference is first made to FIG. 2 wherein is disclosed the cross-support member 11 which spans the distance across the conveyor 4 (see FIGS. 1 and 3). Mounted on the cross-member 11 is the plate 12 having a pivotal support 13 for pivotally supporting an essentially L-shaped member 14 to which is secured the aligner member 40. As disclosed by the phantom line in FIG. 2, the L-shaped support member 14 is pivotal from downward position as shown in full lines to the upward position shown in phantom. In the downward position the aligner element 40 is permitted to contact the articles while in the upward position the articles pass below it.

The pivotal position of the L-shaped member 14 and accordingly the position of the aligner element 40 is determined by the pneumatic cylinder 15 which is pivotally mounted on a plate 16 attached to the bight portion of a U-shaped support frame 17 (FIG. 3).

As also previously referred to, the vertical actuator assembly 10 is actuated along the shafts 23 in a direction longitudinally of the conveyor by means of the longitudinal actuator assembly 30 which includes the cross-support brackets 32 mounted on the side frames 1 and 2 of the conveyor by means of the upright legs 31 and 33, respectively. This cross-support bracket 32 supports one end of a pneumatic cylinder 34, this support means being a pivotal connection 35 as disclosed in FIGS. 1 and 2. The piston rod 38 of the pneumatic cylinder 34 is connected to the cross-support member or bar 11 by the connections 36. As shown in FIG. 2, a solenoid valve 37 is provided for controlling the operation of the pneumatic cylinder 34. It should be evident that operating the pneumatic cylinder 34 to withdraw the piston rod 38 into the cylinder will cause the vertical actuator assembly to be moved to the left while extension of the piston rod 38 will cause the vertical actuator assembly 10 to be moved go the right.

The longitudinal aligner assembly 50 includes the cross-support bar 51 which spans the entire width of the conveyor and is supported at each end on the conveyor frame members 1 and 2. Supported on and depending from the cross-bar member 51 are a plurality of spacer-aligner elements 52 extending longitudinally of conveyor 4. These elements 52 have pointed ends facing the articles B, as they travel down the line, so as to engage the articles B to space and align them in rows running in the direction of travel of the conveyor. Aligner elements 52 are located immediately behind (or downstream) of aligner 40 so that aligner 40 pushes the articles into the spacer-aligner elements 52.

Figure 4:
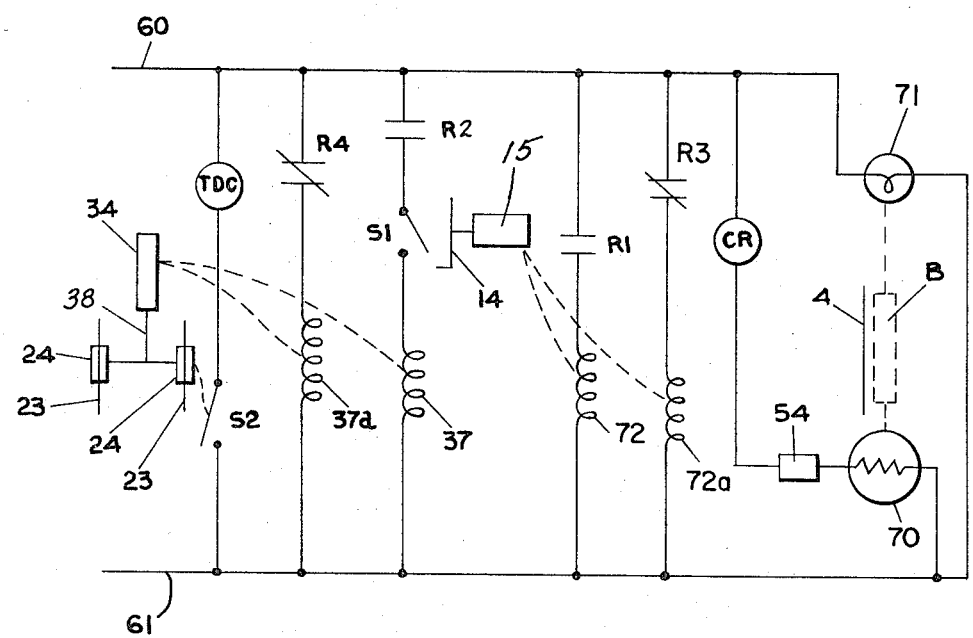
FIG. 4 is a schematic circuit diagram utilized in conjunction with the aligner assembly for controlling the actuation of the aligner.

FIG. 4 discloses a schematic circuit diagram of one means for controlling the actuation of the pneumatic cylinders 15 and 34. The circuit shown is schematic and is illustrative of only one way this can be accomplished. The circuit includes the two main lines 60 and 61 across on which is imposed a source of potential. The first circuit across these lines is a circuit which contains a light beam source 71 which, as schematically shown, projects a beam of light across the conveyor 4 to a photoelectric cell 70 which with time delay switch 54 and relay coil CR forms another circuit across the two lines 60 and 61. As will be explained in more detail hereinafter, the photoelectric cell 70 controls the flow of current through the relay coil CR. The time delay switch unit 54 also controls the current flow as will be described hereinafter. Relay coil CR is a part of a multi-contact relay switch unit which also includes the relay contacts R1, R2, R3, and R4. The relay contacts R3 are normally closed and are connected in series with the solenoid valve coil 72a. The relay contacts R1 are connected in series with the solenoid valve coil 72. The solenoid relay coils 72 and 72a control the actuation of the pneumatic cylinder 15.

Relay contacts R2, which are normally open, are connected in series with the solenoid valve coil 37 and limit switch 31 which is closed by movement of element 14 by the pneumatic cylinder 15.

The last circuit across the two lines 60 and 61 is the time delay coil TDC which forms a part of the time delay unit 54. This coil TDC is connected in series with the limit switch S2 which, as schematically shown, is normally open and is closed by actuation of the pneumatic cylinder 34. The entire operation of this circuit will be explained in greater detail hereinafter under "operation."

OPERATION

Having described the various components and elements in this invention, the operation of the same should be quite evident particularly when considered in conjunction with the circuit diagram of FIG. 4.

Assuming the articles are being conveyed by belt 4 in the direction indicated by arrow, the electric eye or photoelectric cell 70, mounted at the side of the conveyor, senses the presence or non-presence of articles between the cell 70 and light beam source 71. If an article is present, the relay coil CR is not energized in which condition the solenoid coils 72a and 37a which control the operation of the pneumatic cylinders 15 and 34 cause the pneumatic cylinders 15 and 34 to position the L-shaped support bracket 14 and thus the aligner element 40 upwardly and to the right (as viewed in FIGS. 1 and 2) out of contact with any of the articles. Thus, the articles are flowing underneath the aligner element 40 (see FIG. 2 with element 40 in phantom position). However, when the photoelectric cell senses the absence of an article, immediately this energizes the coil CR which closes relay contacts R1 and R2 and opens relay contacts R3 and R4. Opening contacts R3 and R4 de-energizes valve solenoid coils 37a and 72a. Closing contacts R1 energizes valve solenoid 72 causing pnuematic cylinder 15 to extend piston rod 18 which pivots member 14 along with the aligner element 40 downwardly into the position as shown in solid lines in FIG. 2. At this time the wiper element 40 is then located between the transverse rows of articles and immediately behind the row of articles which it is about to align. Pivoting member 14 downwardly closes switch S1 which closes the circuit through valve solenoid 37 causing the pnuematic cylinder 34 to be actuated and extend its piston rod 38 which pushes the entire vertical actuator assembly 10 forwardly in the direction of movement of the conveyor. In so moving forward, the aligner element 40 contacts the back surface of each of the articles in the row immediately ahead of it and thus aligns the articles one with another in a straight line across the conveyor. In so pushing the articles B forwardly, they are forced between the spacer-aligner elements 52 of longitudinal aligner assembly 50. This spaces and aligns the articles in rows running in the direction of travel of the conveyor. When pnuematic cylinder 34 pushes the vertical actuator mechanism forwardly, limit switch S2 is closed which energizes coil TDC of a time delay switch unit which includes a time delay switch 54. Switch 54 immediately opens the circuit through relay coil CR and holds it open for a pre-determined time determined by the spacing of the cakes B on the conveyor belt 4. It then closes awaiting the presence of the next row of cakes to be sensed by the photoelectric cell 70.

When coil CR is de-energized this immediately de-energizes valve solenoid coils 72 and 37 and energizes coils 72a and 37a causing the pneumatic cylinders 15 and 34 to return the aligner 40 to its original position permitting the cakes to pass under the aligner 40.

Shortly thereafter, the photoelectric cell 70 senses the next row of cakes and it therefore immediately energizes relay coil CR which controls the pnuematic cylinders 15 and 34 to repeat the operation just described.

It should become quite evident from the above description that this invention provides an aligner which does not oppose the force being imposed on the article by the conveyor, but to the contrary moves the articles in the same position as the conveyor thus eliminating any damage to the articles which otherwise might be encountered. This is particularly true of such articles as small cakes, which when brushed over by an aligner element are disintegrated along the top edges and otherwise damaged in many different ways.

This invention is a simply constructed apparatus for aligning. It is rugged and of very few parts. It can easily be installed on any existing conveyor with very little difficulty.

Having described my invention, it should also be equally obvious that there may be many embodiments and modifications thereof which can be made without departing from the spirit of the invention. Therefore, such embodiments and modifications are considered to be within the scope of this invention unless especially restricted by the appended claims.

The embodiments of the invention in which an exclusive property or privilege is claimed are defined as follows:

1. An apparatus for aligning a plurality of articles in rows extending transversely on a moving conveyor and in rows extending in the direction of travel of said conveyor comprising: aligner means mounted above said conveyor and extending transversely of and downwardly toward said conveyor for contacting articles thereon; actuator means for actuating said aligner means to at least two positions, one position being an upper position located above said articles and the other position being a lower position for contacting said articles; said actuating means including means for actuating said aligner means longitudinally of said conveyor while said aligner means is in said downward position for pushing said articles arranged in a row extending transversely of said conveyor into a straight line extending transversely of said conveyor and spacer alignment elements spaced transversely across said conveyor for aligning said articles in rows extending in the direction of travel of said conveyor.

2. An apparatus for aligning articles transversely on a moving conveyor comprising: aligner means mounted above said conveyor and extending transversely of and downwardly toward said conveyor for contacting articles thereon; actuator means for actuating said aligner means to at least two positions, one position being an upper position located above said articles and the other position being a lower position for contacting said articles; said actuating means including means for actuating said aligner means longitudinally of said conveyor while said aligner means is in said downward position for pushing said articles arranged in a row extending transversely of said conveyor into a straight line extending transversely of said conveyor; and spacer-alignment elements positioned immediately downstream of said aligner means whereby articles pushed by said aligner means are pushed between said spacer-aligner elements.

3. The apparatus of claim 1 and further including sensing means for sensing the position of said row of articles; and means responsive to the said sensing means for controlling the operation of said actuating means.

4. The apparatus of claim 2 in which the aligner means is arranged to contact the articles at surfaces thereof facing in a direction opposite to the direction of movement of said conveyor, and said actuating means actuates said aligner means while in said downward position in the same direction as the direction of movement of said conveyor and articles.

5. The apparatus of claim 1 in which said spacer-alignment elements are located immediately downstream of said aligner means whereby articles pushed by said aligner means are pushed between said spacer-aligner elements.

6. The apparatus of claim 2 in which the actuator means includes two separate actuators, one for actuating said aligner up and down and another for actuating said one actuator and aligner as a unit longitudinally of said conveyor.

7. The apparatus of claim 6 in which the operation of said second actuator is initiated by the previous operation of said one actuator.

8. The apparatus of claim 2 in which the aligner means is a member pivoted on a support member extending transversely of said conveyor.

9. The apparatus of claim 8 in which the support member is mounted on guide support members located on each side of said conveyor.

10. The apparatus of claim 9 in which said actuator means is fluid cylinder actuating means.

11. The apparatus of claim 2 in which a support means is provided extending transversely across and above said conveyor; track means on each side of said conveyor for reciprocally supporting said support means; said aligner means being an inverted L-shaped member and having one leg extending downwardly toward said conveyor and the other leg extending longitudinally of said conveyor; said actuator means including a first actuator for pivoting said aligner means from said one upper position to said lower position, said actuator means being mounted on said support means; and said means for actuating said aligner means longitudinally of said conveyor including a second actuator for applying a force to said support means causing the entire unit including said support means, first actuator, and said inverted L-shaped member of said aligner means to be moved longitudinally on said track means.

12. The apparatus of claim 11 in which the support means includes an inverted U-shaped frame member mounted on a support bar and said first actuator is a fluid cylinder mounted between the bight portion of said U-shaped member and said support bar.

13. The apparatus of claim 2 in which a sensing means is provided for sensing the position of said row of articles; and means responsive to the said sensing means for controlling the operation of said actuating means.

* * * * *